Figure 1:
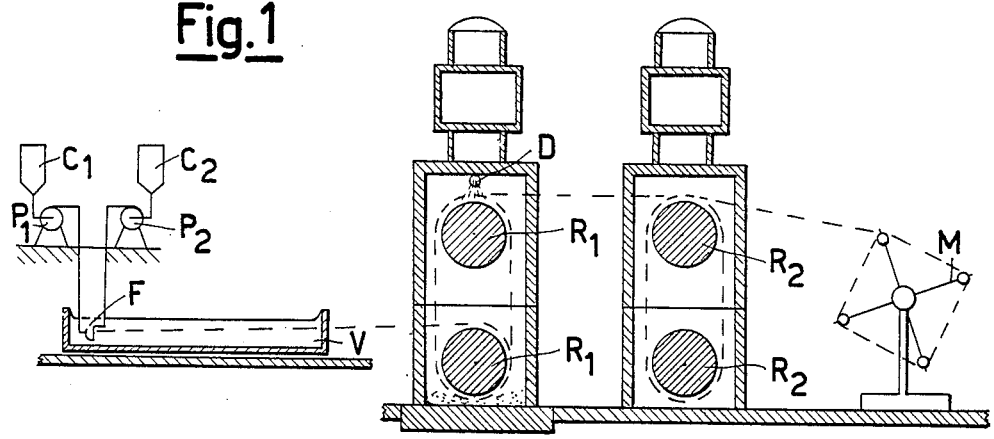

United States Patent [19]

Pittalis et al.

[11] Patent Number: 4,830,796
[45] Date of Patent: May 16, 1989

[54] PROCESS FOR PREPARING A POLYESTER-AMIDE HOLLOW FIBER MEMBRANE

[75] Inventors: Francesco Pittalis; Francesco Bartoli, both of Rome, Italy

[73] Assignee: Eniricerche S.p.A., Milan, Italy

[21] Appl. No.: 60,247

[22] Filed: Jun. 9, 1987

[30] Foreign Application Priority Data

Jun. 20, 1986 [IT] Italy ............................... 20863 A/86

[51] Int. Cl.$^4$ ............................ C08J 9/28; C08J 9/34; B29C 47/20
[52] U.S. Cl. .................................. 264/41; 210/500.23; 210/500.38; 264/45.5; 264/184; 264/209.1; 264/209.5
[58] Field of Search ............. 264/41, 184, 45.5, 209.1, 264/209.5; 210/500.23, 500.38

[56] References Cited

U.S. PATENT DOCUMENTS

| | | | |
|---|---|---|---|
| 3,888,771 | 6/1975 | Isuge et al. ..................... | 264/199 X |
| 3,962,158 | 6/1976 | Mima et al. ..................... | 210/500 M |
| 4,071,454 | 1/1978 | Yamamoto et al. ............ | 264/185 X |
| 4,454,085 | 6/1984 | Schindler et al. ............... | 264/41 |
| 4,460,526 | 7/1984 | Makino et al. ................... | 264/41 |
| 4,481,260 | 11/1984 | Nohmi ............................... | 264/41 X |

FOREIGN PATENT DOCUMENTS

| | | |
|---|---|---|
| 2314215 | 1/1977 | France . |
| 2324337 | 4/1977 | France . |
| 2396106 | 1/1979 | France . |
| 1365952 | 9/1974 | United Kingdom . |
| 1503270 | 3/1978 | United Kingdom . |
| 2002679 | 2/1979 | United Kingdom . |

*Primary Examiner*—Philip Anderson
*Attorney, Agent, or Firm*—Hedman, Gibson, Costigan & Hoare

[57] ABSTRACT

A hollow fibre of polyester-amide, useful in the process of dialysis and in ultra-filtration processes in general, is formed by a polyester-amide with repetitive units (TATE)$_n$ (wherein T is the terephthalic acid radical; A is the ethylenediamine radical; and E is the hexanediol radical).

Such a fibre is obtained by a process which comprises the following steps, carried out sequentially:

preparation of a solution of polyesteramide (TATE)$_n$ in a solvent constituted by formic acid at a concentration higher than about 99%, or constituted by a solution of lithium chloride in dimethylformamide or dimethylacetamide;

extrusion of said solution through a spinnerette having a cross section of annular shape and coagulation of the fibre in an aqueous coagulation bath, with the possible introduction of an aqueous coagulating liquid to the interior of the annular opening of the spinnerette;

washing with water and recovery of the so-obtained hollow fibre.

12 Claims, 2 Drawing Sheets

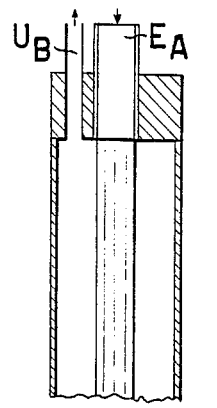
Fig. 3
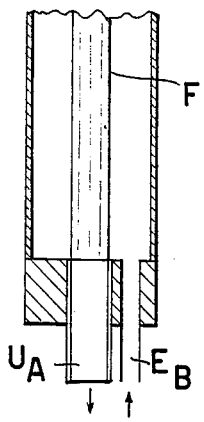
Fig. 4
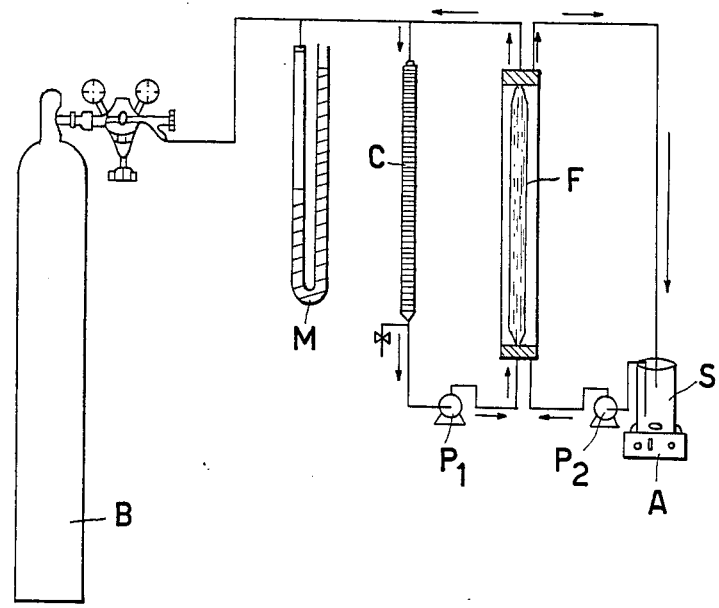

PROCESS FOR PREPARING A POLYESTER-AMIDE HOLLOW FIBER MEMBRANE

The present invention relates to a hollow fibre of polyester-amide and to the process for preparing it.

In the art hollow fibres are known, which are used in the processes of dialysis and ultrafiltration, and are obtained by starting from such synthetic polymers as polyvinyl alcohol and acrylic polymers, or from regenerated cellulose or from cellulose derivatives, such as disclosed, e.g., in U.S. Pat. Nos. 3,888,771, 3,962,158, and in French Pat. Nos. 2,314,215, 2,324,337 and 2,396,106.

In case of synthetic polymers, dfficulties exist in controlling the dimensions and the distribution of the pores of the hollow fibres, and some times problems exist of haemocompatibility; due to such reasons, these hollow fibres have had, to date, an only limited commercial success.

On the other hand, the process for the preparation of hollow fibres from cellulosic materials, based on the copper-ammonium method, is burdensome, and the so-obtained hollow fibres display a good permeability for the substances having a relatively low molecular weight, but not completely satisfactory permeability values for the substances having an average or relatively high molecular weight, and this constitutes a drawback in their application, in particular in the haemodialysis processes.

It has been found now that it is possible to obtain hollow fibres endowed with good characteristics of permeability for substances having a molecular weight comprised within a wide range of values, by means of a simple and convenient process, which uses a particular polyester-amide as the starting material. Said hollow fibres have furthermore a controlled distribution of the pores, they are mechanically strong, and do not give rise to haemocompatibility problems, thus overcoming, or at least greatly reducing, the problems involved by the hollow fibres of the known art.

Accordingly, the present invention relates to a hollow fibre of polyester-amide, useful in the processsses of dialysis and in general in the ultrafiltration processes, formed by a polyester-amide with repetitive unit (TATE) (wherein T is the radical of terephthalic acid; A is the radical of ethylenediamine; and E is the radical of hexanediol), said hollow fibre having an outer diameter of from 200 to 1000 μm, a wall thickness of from 20 to 200 μm, a water permeability value of up to 7.5 liters/m$^2$/hour, for a ΔP of 300 mm$_{Hg}$ and being endowed with a good permeability for substances having a molecular weight of up to about 17,000.

According to another aspect thereof, the present invention relates to the process for preparing said hollow fibre, said process comprising the following steps, carried out sequentially:

preparation of a soluton of polyester-amide (TATE)$_n$ in a solvent constituted by formic acid at a concentration higher than about 99%, or constituted by a solution of lithium chloride in dimethylformamide or dimethylacetamide;

extrusion of said solution through a spinnerette having a cross section of annular shape and coagulation of the fibre in an aqueous coagulation bath, with the possible introduction of an aqueous coagulating liquid to the interior of the annular opening of the spinnerette;

washing with water and recovery of the so-obtained hollow fibre.

By polyester-amide, according to the present invention, a copolymer is meant which comprises the repetitive unit (TATE)$_n$, wherein:

T represents the radical of terephthalic acid; A represents the radical of ethylenediamine; and E represents the radical of hexanediol). As regards the preparation and the general characteristics of such a polyester-amide, reference is made to Italian Pat. Nos. 908,843 and 908,844. To the purposes of the present invention, also those polyester-amides are useful, which have the above-indicated repetitive unit, and which are endowed with the following characteristics:

relative viscosity: from 2 to 2.5 (measured at 25° C., with 1% by weight of polymer in a 1:1 by volume phenol-tetrachloroethane solvent mixture);

content of free carboxy groups: from 15 to 25 meq/kg;

melting point: from 252° to 260° C.

Preferred are, to the purpose of the present invention, the polyester-amides which have the following characteristics:

relative viscosity: about 23;

content of free carboxy groups: about 22 meq/kg;

melting point: about 255° C.

According to the process of the present invention, a solution is prepared of the polyester-amide in a solvent selected from:

formic acid at a concentration higher than about 99%;

dimethylformamide containing dissolved lithium chloride;

dimethylacetamide containing dissolved lithium chloride.

In particular, by the solvent consisting of formic acid at a concentration higher than 99%, it is possible to prepare solutions containing up to about 35 parts by weight of polyester-amide, per each 100 parts by weight of solvent, operating at temperatures of up to about 100° C.

In case of the other above mentioned solvents, the amount of dissolved lithium chloride is normally varying within the range of from 2 to 7 parts by weight per each 100 parts by weight of dimethylformamide or of dimethylacetamide. In the typical case of a solvent containing from 4 to 6 parts by weight of dimethylformamide or of dimethylacetamide, it is possible to prepare solutions containing up to about 35 parts by weight of polyester-amide per each 100 parts by weight of the same solvent, at temperatures up to about 100° C.–120° C.

In the preferred embodiment of the present invention, there is used as the solvent for polyesteramide a solution of 4 to 6 parts by weight of lithium chloride in dimethylformamide or dimethylacetaide and the polyesteramide is dissolved in such solvent up to a concentration of from 15 to 35 parts by weight per 100 parts by weight of the solvent concerned.

The so-obtained polymer solution is submitted to an outgassing step and to a filtration step, and is then extruded into the coagulation bath through a spinnerette of annular cross-section.

The spinning process is advantageously carried out with a temperature of the polymer solution comprised within the range of from 40° C. to 90° C. and with an aqueous coagulation bath kept at temperature values close to room (20° C.–25° C.) or nearly room temperature.

The spinnerette suitable to that purpose is a spinnerette for hollow fibres of the "tube in orifice" type, constituted by an annuls, through which the polymer solution is extruded, and which is additionally provided with a central bore, through which the aqueous liquid for the inner fibre coagulation can be fed.

Typically, the spinnerette has an outer diameter of the annular cross sectionof the order of 1 mm, an inner diameter of the annular cross section of the order of 0.6 mm, and has a central bore with a diameter of the order of 0.2 mm.

According to a form of practical embodiment of the present invention, outside and inside the hollow fibre different coagulation conditions are adopted.

That can be accomplished by introducing into the central bore of the spinnerette an aqueous solution of dimethylformamide or of dimethylacetamide, or into said central bore a stream or air, or of another inert gas, is fed, which has essentially the function of "supporting" the hollow fibre.

In this way, varying the characteristics of the hollow fibre results possible, as it shall be evident from the following experimental examples.

According to another form of practical embodiment, to the solution of the polymer a vertical run in air is allowed, before entering the coagulation bath. Also in this case, exerting an influence on the morphological characteristics of the hollow fibre is possible.

The coagulated hollow fibre is then submitted to a washing step with water, and is finally collected as a skein. During the spinning, giving a certain degree of draft to the fibre is possible, by making the rollers for fibre drawing from the coagulation bath, and the rollers for collection of the washed fibre rotate at different speeds.

The eventually obtained hollow fibre is conveniently stored in a glycerol-water bath (typically at 70:30 by volume), containing formaldehyde (typically, 100 ppm). The so-obtained hollow fibre generally shows an outer diameter of from 200 to 1000 $\mu$m and preferably of from 200 to 400 $\mu$m, and a wall thickness of from 20 to 200 $\mu$m and preferably of from 20 to 100 $\mu$m. Said hollow fibre is endowed with values of permeability to water generally ranging from 2.5 to 7.5 liters/m$^2$/hour, for a $\Delta P$ of 300 mm$_{Hg}$ and with good values of permeability for substances having a molecular weight of up to about 17,000, and that as a function of the conditions under which the same fibre is obtained.

When examined by the electron microscope, the wall of the hollow fibre results constituted by two thick and compact outer layers, and by a porous inner layer, possibly with different porosity, as a function of the coagulation process used, but however with the pores having a uniform size and being evenly distributed.

Such a hollow fibre is particularly useful in the dialysis processes, in particular in the dialysis processes and in the ultrafiltration processes in general.

Figure 2:
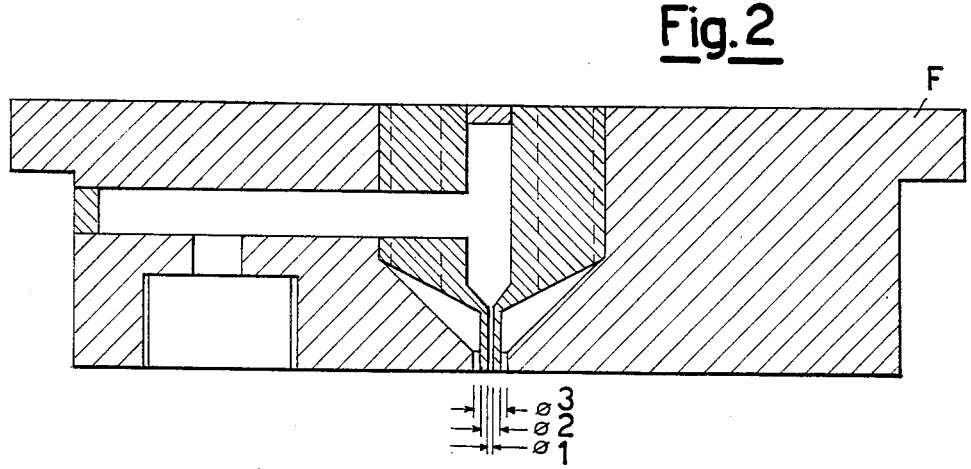
Figure 2A:
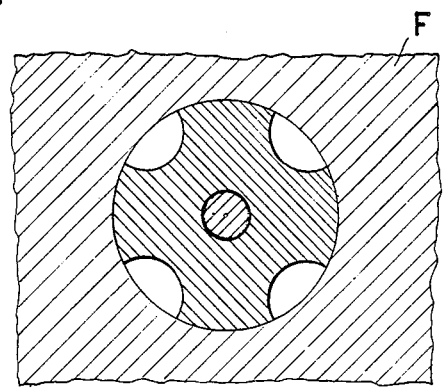

In the following experimental examples, which are supplied to purely illustrative and not limitative purposes, the hollow fibre is prepared by using the equipment as illustrated in FIGS. 1 and 2. In particular, in FIG. 1 with C1 the vessel for the storage of the solution of polyester-amide and with P1 the supply pump for feeding the polymeric solution to the spinnerette F is indicated.

To the purpose of controlling the temperature of the polymeric solution, the vessel C1, the pump P1 and the spinnerette F are provided with a special temperature-controlling system.

The spinnerette F is of the "tube in orifice" type, and is illustrated in detail in FIG. 2. In this spinnerette, the orifice for the extrusion of the polymeric solution is constituted by an annulus having an outer diameter $\phi_3$ of 1 mm, and with an inner diamer $\phi_2$ of 0.6 mm.

Through the central bore, having a diameter $\phi_1$ of 0.2 mm, a fluid is fed which performs a coagulating function for the polymeric solution, and/or acts as a support for the fibrous structure. Thus, by referring again to FIG. 1, said fluid, contained inside the vessel C2, is fed to the spinnerette by means of pump P2.

When said fluid is a gas, e.g., air or nitrogen, the vessel C2 and the pump P2 are replaced by a gas cylinder and a flowmeter.

The coagulation of the fibre takes place inside the coagulation bath V, according to the process known as the "phase reversal", and consisting in the gelling of the polymeric solution by means of the diffusion of a non-solvent inside the solution, contemporaneously to the diffusion, to the opposite direction, of the solvent in the coagulant.

On its exit from the coagulation bath V, the hollow fibre is drawn by the pair of rollers R$_1$, is washed with water by means of the shower D, is drawn by means of a second pair of rollers R$_2$ and is finally collected by the skeiner M.

To the purpose of evaluating the dialytic characteristics of the hollow fibre, the equipment shown in FIGS. 3 and 4 is used.

In particular, the hollow fibre is positioned inside the container illustrated in FIG. 3, wherein with F the fibre is shown, and with EA the inlet and with UA the outlet of the fibres-comprising loop are shown. With EB and UB, the inlet and the outlet of the loop external to the fibres are indicated.

This container is used on the equipment illustrated in FIG. 4, to the purpose of determining the coefficient of diffusion, through the same fibre, of the following substances: sodium chloride, urea, creatinine, uric acid, vitamin B12, inulin, myoglobin and albumin, and that according to the methodology as described by E. Klein, F. Holland, A. Leboef, A. Donnaud and J. H. Smith in Journal of Membrane Science, 1, 371–396 (1976).

In particular referring to said FIG. 4, the solution containing the substance under examination is recycled through the fibre F by means of the pump P$_1$. By means of the calibrated burette C, the changes in volume can be monitored and, if necessary, the loop can be pressurized by the nitrogen contained inside the cylinder C, under the pressure as indicated by the pressure gauge X. Distilled water is recycled, through the pump P$_2$, through a second loop comprising the vessel volume external relatively to the hollow fibre F and the collection tank S, the contents of which are kept stirred by means of stirrer A. From the tank S, samples are periodically drawn to the purpose of determining the amount of the substance under examination, diffused through the hollow fibre.

EXAMPLE 1

Polyester-amide (TATE)$_n$ having the following characterisfics:
relative viscosity: 2.3;
content of free carboxy groups: 22 meq/kg;

melting point: 255° C.
(15 parts by weight) is dissolved in a solution of lithium chloride (5 parts by weight) in dimethylacetamide (80 parts by weight), by operating at 100° C. and with stirring, until a clear solution is obtained. The so-obtained solution is cooled to 45°-50° C., is vacuum-outgassed for 6 hours and is filtered through a 500-mesh steel net.

The solution, at 50° C., is then extruded through the spinnerette, with a flowrate of 390 ml/hour, while water is injected, through the central bore of the spinnerette, at a flowrate of 450 ml/hour.

The coagulation of the fibre takes place inside the coagulation bath, containing 5 liters of water, at the temperature of about 20° C. The coagulated fibre is then washed with water and is collected on the skeiner, at a rate of 20 m/minute.

Thus, bundles are obtained of hollow fibres which, after the inner liquid being drained off, are washed with tap water for 24 hours.

The fibre is subsequently conditioned with a water/glycerin solution (70/30 by volume) containing 100 ppm of formaldehyde.

On the so-obtained fibre, the characteristics are determined, which are reported in following Table 1:

TABLE 1

| Substance | Diffusion Coefficient (cm$^2$/second) |
|---|---|
| Sodium Chloride | $1.9 \cdot 10^{-6}$ |
| Urea | $1.7 \cdot 10^{-6}$ |
| Uric acid | $1.0 \cdot 10^{-6}$ |
| Creatinine | $1.3 \cdot 10^{-6}$ |
| Vitamin B12 | $2.5 \cdot 10^{-7}$ |
| Inulin | $2.4 \cdot 10^{-7}$ |
| Myoglobin | 0 |
| Albumin | 0 |

The fibre permeability to water is of 4.3 liters/m$^2$/hour, for a $\Delta P$ of 300 mm$_{Hg}$.

The dimensions of the fibre are:
outer diameter: 800 μm;
wall thickness: 130 μm.

EXAMPLE 2

20 Parts by weight of the polyester-amide of Example 1 is dissolved in a solution constituted by 75 parts by weight of dimethylacetamide and 5 parts by weight of lithium chloride. The spinning process is carried out as in Example 1 and a hollow fibre is obtained, which has the characteristics as reported in following Table 2.

TABLE 2

| Substance | Diffusion Coefficient (cm$^2$/second) |
|---|---|
| Sodium Chloride | $2.1 \cdot 10^{-6}$ |
| Urea | $1.5 \cdot 10^{-6}$ |
| Uric acid | $0.7 \cdot 10^{-6}$ |
| Creatinine | $1.0 \cdot 10^{-6}$ |
| Vitamin B12 | $1.9 \cdot 10^{-7}$ |
| Inulin | $3.2 \cdot 10^{-7}$ |
| Myoglobin | 0 |
| Albumin | 0 |

The fibre permeability to water is of 3.8 liters/m$^2$/hour, for a $\Delta P$ of 300 mm$_{Hg}$.

The dimensions of the fibre are:
outer diameter: 830 μm;
wall thickness: 170 μm.

EXAMPLE 3

25 Parts by weight of the polyester-amide of Example 1 is dissolved in a solution constituted by 70 parts by weight of dimethylacetamide and 5 parts by weight of lithium chloride. The process is carried out as in Example 1 and a hollow fibre is obtained, which has the characteristics as reported in following Table 3.

TABLE 3

| Substance | Diffusion Coefficient (cm$^2$/second) |
|---|---|
| Sodium Chloride | $0.7 \cdot 10^{-6}$ |
| Urea | $0.4 \cdot 10^{-6}$ |
| Uric acid | $1.0 \cdot 10^{-7}$ |
| Creatinine | $2.3 \cdot 10^{-7}$ |
| Vitamin B12 | $3.4 \cdot 10^{-7}$ |
| Inulin | $3.5 \cdot 10^{-8}$ |
| Myoglobin | 0 |
| Albumin | 0 |

The fibre permeability to water is of 2.7 liters/m$^2$/hour, for a $\Delta P$ of 300 mm$_{Hg}$.

The dimensions of the fibre are:
outer diameter: 870 μm;
wall thickness: 170 μm.

EXAMPLES 4 AND 5

15 Parts by weight of the polyester-amide of Example 1 is dissolved in a solution constituted by 80 parts by weight of dimethylformamide and 5 parts by weight of lithium chloride (Example 4) and further 20 parts by weight of polyester-amide are dissolved in a solution constituted by 75 parts by weight of dimethylformamide and 5 parts by weight of lithium chloride. The two so-obtained polymeric solutions are filtered, outgassed and extruded at 85° C.

Then, by continuing as disclosed in Example 1, hollow fibres are obtained, which have the characteristics as reported in following Table 4.

TABLE 4

| Substance | Diffusion Coefficient (cm$^2$/second) | |
|---|---|---|
| | Example 4 | Example 5 |
| Sodium Chloride | $1.3 \cdot 10^{-6}$ | $1.0 \cdot 10^{-6}$ |
| Urea | $1.0 \cdot 10^{-6}$ | $1.3 \cdot 10^{-6}$ |
| Uric acid | $2.8 \cdot 10^{-7}$ | $2.0 \cdot 10^{-7}$ |
| Creatinine | $6.9 \cdot 10^{-7}$ | $3.1 \cdot 10^{-7}$ |
| Vitamin B12 | $1.5 \cdot 10^{-7}$ | $1.2 \cdot 10^{-7}$ |
| Inulin | $3.7 \cdot 10^{-8}$ | $2.4 \cdot 10^{-8}$ |
| Myoglobin | 0 | 0 |
| Albumin | 0 | 0 |

The fibre permeability to water is of 2.7 liters/m$^2$/hour (Example 4) and 2.1 liters/m$^2$/hour (Example 5), for a $\Delta P$ of 300 mm$_{Hg}$.

The dimensions of the fibre are:
Example 4:
outer diameter: 890 μm;
wall thickness: 150 μm.
Example 5
outer diameter: 870 μm;
wall thickness: 160 μm.

EXAMPLE 6

15 Parts by weight of the polyester-amide of Example 1 is dissolved in a solution constituted by 80 parts by weight of dimethylacetamide and 5 parts by weight of lithium chloride. The process is carried out as in Example 1, with the following variations:

inside the fibre, nitrogen is injected (200 ml/hour);
the extrusion rate of the polymeric solution if of 340 ml/hour;
in the scheme of FIG. 1 a third pair of rollers is inserted, and the collection speed of the three pairs of rollers is differentiated as follows: 1st pair, collection rate 24 m/minute; 2nd pair, collection rate 34 m/minute; 3rd pair, collection rate 36 m/minute.

By operating under the above indicated conditions, a hollow fibre is obtained, which has the characteristics as reported in following Table 5.

TABLE 5

| Substance | Diffusion Coefficient (cm$^2$/second) |
|---|---|
| Sodium Chloride | $3.7 \cdot 10^{-6}$ |
| Urea | $2.3 \cdot 10^{-6}$ |
| Uric acid | $1.9 \cdot 10^{-6}$ |
| Creatinine | $2.3 \cdot 10^{-6}$ |
| Vitamin B12 | $9.7 \cdot 10^{-7}$ |
| Inulin | $2.4 \cdot 10^{-7}$ |
| Myoglobin | $2.1 \cdot 10^{-7}$ |
| Albumin | traces |

The fibre permeability to water is of 7.2 liters/m$^2$/hour, for a $\Delta P$ of 300 mm$_{Hg}$.

The dimeensins of the fibre are:
outer diameter: 450 μm;
wall thickness: 80 μm.

EXAMPLE 7

15 Parts by weight of the polyester-amide of Example 1 is dissolved in a solution constituted by 80 parts by weight of dimethylacetamide and 5 parts by weight of lithium chloride. The process is carried out as in Example 1, with the following variations:

the polymeric solution is extruded at a flowrate of 340 ml/hour;
inside the fibre, water is injected at a flowrate of 150 ml/hour;
the spinnerette is kept above the coagulation bath, at such a distance that the solution runs along a vertical path of 1.5 m before entering the coagulation bath;
the collection of the fibre is carried out by using three pairs of rollers, at the following rates: 1st pair, collection rate 18 m/minute; 2nd pair, collection rate 26 m/minute; 3rd pair, collection rate 28 m/minute.

By operating under the above indicated conditions, a hollow fibre is obtained, which has the characteristics as reported in following Table 6.

TABLE 6

| Substance | Diffusion Coefficient (cm$^2$/second) |
|---|---|
| Sodium Chloride | $4.3 \cdot 10^{-6}$ |
| Urea | $2.1 \cdot 10^{-6}$ |
| Uric acid | $1.3 \cdot 10^{-6}$ |
| Creatinine | $2.6 \cdot 10^{-6}$ |
| Vitamin B12 | $6.0 \cdot 10^{-7}$ |
| Inulin | $2.8 \cdot 10^{-7}$ |
| Myoglobin | $1.6 \cdot 10^{-7}$ |
| Albumin | 0 |

The fibre permeability to water is of 7.5 liters/m$^2$/hour, for a $\Delta P$ of 300 mm$_{Hg}$.

The dimensions of the fibre are:
outer diameter: 400 μm;
wall thickness: 110 μm.

EXAMPLE 8

15 Parts by weight of the polyester-amide of Example 1 is dissolved in a solution constituted by 80 parts by weight of dimethylacetamide and 5 parts by weight of lithium chloride.

The spinning process is carried out as in Example 7, with the exception that the fibre is kept immersed inside the coagulation bath and the liquid fed to the interior of the fibre is a water/dimethylacetamide (2/1 by volume) mixture.

By operating under the above indicated conditions, a hollow fibre is obtained, which has the characteristics as reported in following Table 6.

TABLE 7

| Substance | Diffusion Coefficient (cm$^2$/second) |
|---|---|
| Sodium Chloride | $2.7 \cdot 10^{-6}$ |
| Urea | $2.1 \cdot 10^{-6}$ |
| Uric acid | $1.8 \cdot 10^{-6}$ |
| Creatinine | $2.2 \cdot 10^{-6}$ |
| Vitamin B12 | $9.5 \cdot 10^{-7}$ |
| Inulin | $2.9 \cdot 10^{-7}$ |
| Myoglobin | $1.9 \cdot 10^{-7}$ |
| Albumin | 0 |

The fibre permeability to water is of 6.5 liters/m$^2$/hour, for a $\Delta P$ of 300 mm$_{Hg}$.

The dimensions of the fibre are:
outer diameter: 490 μm;
wall thickness: 110 μm.

We claim:

1. Process for preparing a hollow fiber of small diameter and thin permeable walls for dialysis and for ultrafiltration comprising:

(a) preparing a solution of polyesteramide (TATE)$_n$, wherein T is the radical of terephthalic acid, A is the radical of hexamethylenediamine, and E is the radical of hexanediol, in a solvent constituted by formic acid at a concentration higher than about 99%, or constituted by a solution of lithium chloride in dimethylformamide or in dimethylacetamide;

(b) extruding said solution through a spinnerette having a cross section of annular shape into an aqueous coagulation bath, with the optional introduction of an coagulating substance into said spinnerette; and (c) washing with water and recovering said resulting hollow fiber, said hollow fiber having an outer diameter of from 200 to 1000 μm, a wall thickness of from 20 to 200 μm, a water permeability ranging from 2.5 to 7.5 liters/m$^2$/hour, for a $\Delta P$ of 300 mm$_{Hg}$, and effective permeability for substances having a molecular weight of up to about 17,000.

2. The process according to claim 1, wherein said polyesteramide has a relative viscosity of from 2 to 2.5, as measured at 25° C., with 1% by weight of polyesteramide in a solvent mixture constituted by 1:1 phenol-tetrachloroethane by volume, a content of free carboxy groups of from 15 to 25 meq/kg, and a melting point of from 252° to 260° C.

3. The process according to claim 2 wherein said polyesteramide has a relative viscosity of 2.3.

4. The process according to claim 2 wherein said polyesteramide has a content of free carboxy groups of about 22 meq/kg.

5. The process according to claim 2 wherein said polyesteramide has a melting point of about 255° C.

6. The process of according to claim 1, wherein said solvent is constituted by a solution of 2-7 parts by weight of lithium chloride in 100 parts by weight of dimethylformamide or of dimethylacetamide and in said solvent said polyesteramide is dissolved in an amount of from 15 to 35 parts by weight per each 100 parts by weight of solvent.

7. The process according to claim 6 wherein said solvent is constituted by said solution of 4-6 parts by weight of lithium chloride in 100 parts by weight of dimethylformamide or of dimethylacetamide.

8. The process according to claim 1, wherein said solution is at a temperature of from 40° to 90° C. and said aqueous coagulation bath is kept at a temperature equal to or nearly equal to room temperature.

9. The process according to claim 1, wherein said coagulating substance is an aqueous solution of dimethylformamide or dimethylacetamide.

10. The process according to claim 1, wherein said coagulating substance is a stream of inert gas.

11. The process according to claim 1, further comprising: allowing said solution a vertical run in air before entry into said coagulation bath.

12. The process according to claim 1 wherein said hollow fiber has two outer layers and a porous inner layer, said pores of said inner layer having a uniform size and being evenly distributed.

* * * * *